(12) United States Patent
Tillmanns

(10) Patent No.: US 9,444,182 B2
(45) Date of Patent: Sep. 13, 2016

(54) SYSTEM FOR FORMING A MODULAR DISTRIBUTION PANEL AND METHOD FOR ASSEMBLING SAID MODULAR DISTRIBUTION PANEL

(71) Applicant: Phoenix Contact GmbH & Co. KG, Blomberg (DE)

(72) Inventor: Ralf Tillmanns, Schieder-Schwalenberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 7 days.

(21) Appl. No.: 14/385,588

(22) PCT Filed: Mar. 15, 2013

(86) PCT No.: PCT/EP2013/055442
§ 371 (c)(1),
(2) Date: Sep. 16, 2014

(87) PCT Pub. No.: WO2013/135882
PCT Pub. Date: Sep. 19, 2013

(65) Prior Publication Data
US 2015/0056843 A1    Feb. 26, 2015

(30) Foreign Application Priority Data
Mar. 16, 2012    (DE) .................. 10 2012 102 242

(51) Int. Cl.
*H01R 13/62* (2006.01)
*H04Q 1/02* (2006.01)
(Continued)

(52) U.S. Cl.
CPC ............ *H01R 13/62* (2013.01); *H01R 13/508* (2013.01); *H01R 43/18* (2013.01); *H04Q 1/13* (2013.01); *Y10T 29/49208* (2015.01)

(58) Field of Classification Search
CPC ............ H01R 13/6271; H01R 13/518; H01R 13/6273; H01R 13/631; H01R 13/627; H01R 13/6582; H01R 13/6581; H01R 24/64; H01R 13/665; H01R 13/6461
See application file for complete search history.

(56) References Cited

U.S. PATENT DOCUMENTS 4,909,757 A    3/1990  Reed
5,836,786 A    11/1998 Pepe
(Continued)

FOREIGN PATENT DOCUMENTS

DE    697 14 476 T2    2/2003
DE    69 636 873 T2    11/2007
(Continued)

OTHER PUBLICATIONS

PCT/EP2013/055442 International Search Report dated Jun. 5, 2013.

*Primary Examiner* — Truc Nguyen
(74) *Attorney, Agent, or Firm* — Woodard, Emhardt, Moriarty, McNett & Henry LLP

(57) ABSTRACT

The invention relates to a system (16) for forming a modular distribution panel (14), comprising a carrying device (10) having a front plate (20) and comprising at least one distribution module (12), which has at least one connection socket (30) at a head end (28), wherein the head end (28) of the at least one distribution module (12) is opposite the back side of the front plate (20) when the distribution module (12) is fastened to the carrying device (10) and the front plate (20) enables access to the at least one connection socket (30) from the front. The carrying device (10) has a U-profile-shaped accommodating part (18), for which the front plate (20) forms the base of the U-profile shape and into which the head end (28) of the at least one distribution module (12) can be inserted, wherein the distribution module (12) can be detachably fastened to the carrying device (10) at the head end (28) inserted into the accommodating part (18) by means of a clip connection.

Figure 1:
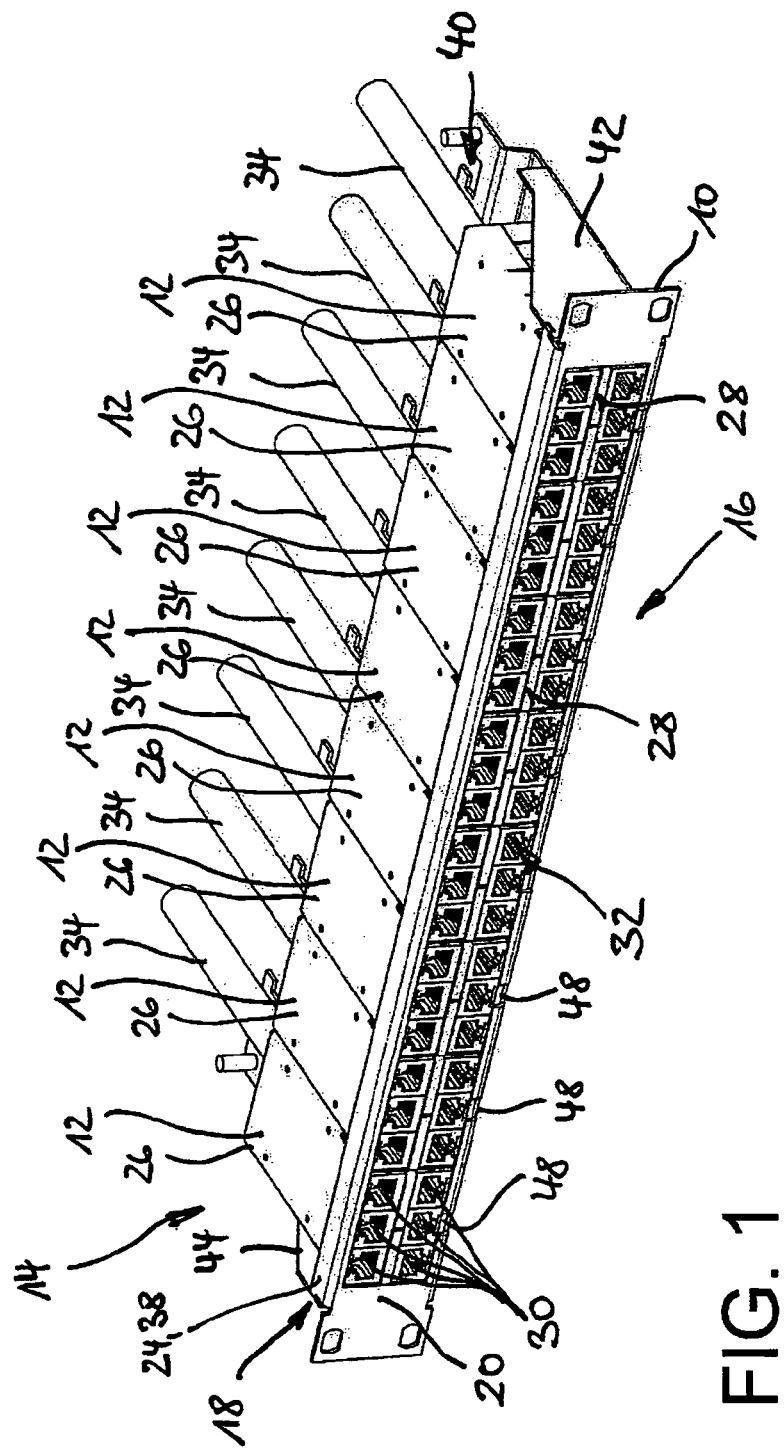

The invention also relates to a method for assembling a corresponding modular distribution panel (14).

11 Claims, 4 Drawing Sheets

(51) Int. Cl.
*H01R 13/508* (2006.01)
*H01R 43/18* (2006.01)

(56) References Cited

U.S. PATENT DOCUMENTS

| | | | | |
|---|---|---|---|---|
| 7,033,210 B1* | 4/2006 | Laurer | ........... | H01R 13/506 439/541.5 |
| 7,112,090 B2 | 9/2006 | Caveney et al. | | |
| 7,294,026 B1* | 11/2007 | Donnell | ........... | H01R 9/2408 439/701 |
| 8,007,318 B1* | 8/2011 | Dunwoody | ........ | H01R 13/6461 439/607.55 |
| 8,585,437 B2* | 11/2013 | Lin | ........... | H01R 13/518 439/532 |
| 2002/0068484 A1* | 6/2002 | Gutierrez | ........... | H01R 24/64 439/620.11 |
| 2005/0282441 A1* | 12/2005 | Murr | ........... | H01R 24/64 439/676 |
| 2009/0280694 A1* | 11/2009 | Zhuang | ........... | H01R 24/64 439/668 |
| 2010/0221951 A1* | 9/2010 | Pepe | ........... | H01R 13/516 439/607.25 |
| 2010/0227500 A1 | 9/2010 | Shih | | |
| 2011/0053418 A1* | 3/2011 | Margulis | ........... | H01R 13/719 439/620.07 |
| 2011/0097924 A1 | 4/2011 | Chen | | |
| 2012/0077375 A1* | 3/2012 | Dietz | ........... | H01R 13/74 439/536 |
| 2012/0244736 A1* | 9/2012 | Duran | ........... | H01R 9/032 439/345 |

FOREIGN PATENT DOCUMENTS

| | | |
|---|---|---|
| DE | 696 36 873 T2 | 11/2007 |
| DE | 10 2008 008 258 A1 | 8/2009 |
| EP | 1 465 438 | 10/2004 |
| EP | 1 478 056 | 11/2004 |
| EP | 1 143 576 | 1/2007 |

\* cited by examiner

SYSTEM FOR FORMING A MODULAR DISTRIBUTION PANEL AND METHOD FOR ASSEMBLING SAID MODULAR DISTRIBUTION PANEL

This application is a National Stage of International Application No. PCT/EP2013/055442 filed Mar. 15, 2013 which claims the benefit of German Patent Application No. 10 2012 102 242.9 filed Mar. 16, 2012, both of which are hereby incorporated by reference.

The invention relates to a system for forming a modular distribution panel, comprising a carrying device having a front plate and comprising at least one distribution module, which has at least one connection socket at a head end, wherein the head end of the at least one distribution module is opposite the back side of the front plate when the distribution module is fastened to the carrying device and the front plate enables access to the at least one connection socket from the front.

The invention also relates to a method for assembling a modular distribution panel.

A system of this type for forming a modular distribution panel and a method of this type for assembling a modular distribution panel are known.

DE 20 2008 0017 U1 presents a modular distribution panel, comprising a carrying device having a front plate and comprising distribution modules, which have at least one connection socket at a respective head end, wherein the head ends of the distribution modules fastened to the carrying device are opposite the back side of the front plate and the front plate enables access to the connection sockets from the front. The distribution modules are fastened by screwing the distribution modules onto the front plate.

The object of the invention is to specify a system and a method for simple assembly of a distribution panel.

The object is achieved in accordance with the invention by the features of the independent claims. Advantageous embodiments of the invention are specified in the dependent claims.

With the system according to the invention, the carrying device has a U-profile-shaped accommodating part, for which the front plate forms the base of the U-profile shape and into which the head end of the at least one distribution module can be inserted, wherein the distribution module can be detachably fastened to the carrying device at the head end inserted into the accommodating part by means of a clip connection. With the corresponding distribution module, the at least one distribution module is then detachably fastened to the carrying device at the head end inserted into the accommodating part by means of the clip connection.

Such a system has the advantage that a tool-free assembly is possible. To this end, the distribution module or each individual distribution module is inserted into the U-profile-shaped accommodating part of the carrying device in a slightly inclined manner with respect to the direction defined by the legs of the U-profile shape and is then swivelled in, such that the clip connection latches in place. In order to enable or to facilitate the insertion at an acute angle (the inclined insertion), the legs can be of different length.

The clip connection (or each of the clip connections in the case of a plurality of distributor modules) is advantageously formed by a detent structure engaging resiliently with a recess structure, wherein one of these structures is formed on the distribution module and the other of these structures is formed on the carrying device. In particular, the detent structure is formed on the distribution module and the recess structure is formed on the carrying device, preferably on a leg of the U-profile shape.

In accordance with a preferred embodiment of the invention, the at least one distribution module has a housing, preferably a housing that can open, which comprises a housing part, in particular a housing base part, on which the detent structure is formed. The configuration is in particular an integral configuration of housing part and detent structure.

In accordance with a preferred embodiment of the invention, the resiliently engaging detent structure is a detent hook arranged on a spring tongue. The detent hook is in particular formed integrally on the spring tongue. To this end, an end region at the free end of the tongue is preferably bent/kinked in a hook-like manner.

The spring tongue advantageously also extends along the outer face of the housing part in the latched state.

In accordance with a preferred embodiment of the invention, the legs of the U-profile-shaped accommodating part are formed by a base plate and a strip opposite the base plate, wherein the leg formed by the base plate is longer than the leg of the U-profile shape formed by the strip.

In accordance with another preferred embodiment of the invention, the spring tongue extends in the latched state via its free end in the direction of the head end.

In accordance with a preferred embodiment of the invention, at least one opening is also formed in the front plate, through which opening a pin-shaped tool can be inserted as far as the corresponding detent element in order to detach the at least one clip connection. This has the advantage that a disassembly "from the front" is possible.

In accordance with a further preferred embodiment of the invention, the at least one distribution module has a printed circuit board, via which the at least one connection socket is electrically connected to another connection device, in particular a cable, arranged at an end of the distribution module opposite the head end. In particular, a plurality of connection sockets are provided per distribution module and are arranged on either side of the printed circuit board.

The invention also relates to a method for assembling a modular distribution panel, from the components of an aforementioned system, wherein the at least one distribution module is inserted at an incline into the U-profile-shaped accommodating part and is then swivelled in, wherein the clip connection latches in place. In order to enable or to facilitate the insertion at an acute angle (the inclined insertion), the legs can be of different length. The insertion is preferably constituted by a sliding movement. The invention will be explained in greater detail hereinafter with reference to the accompanying drawing on the basis of a preferred embodiment.

In the drawing

Figure 2:
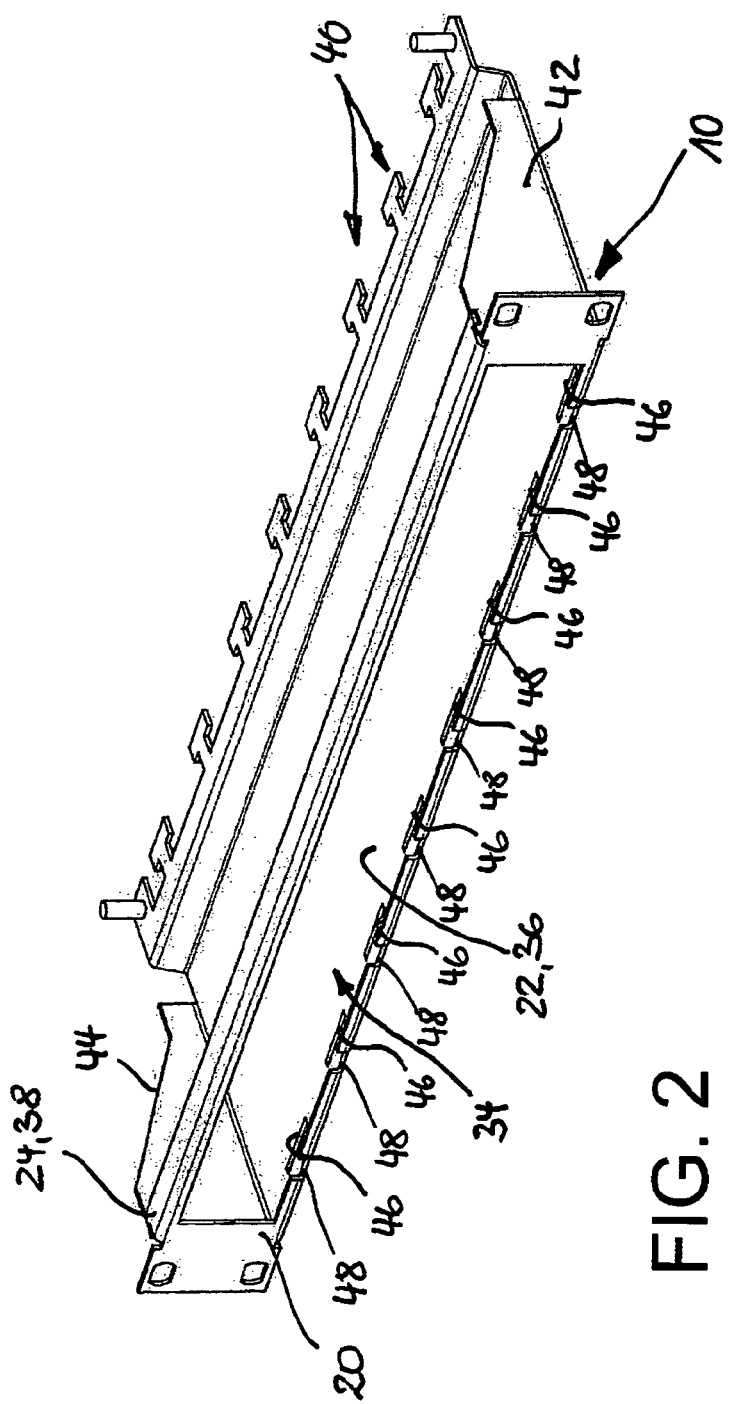
Figure 3:
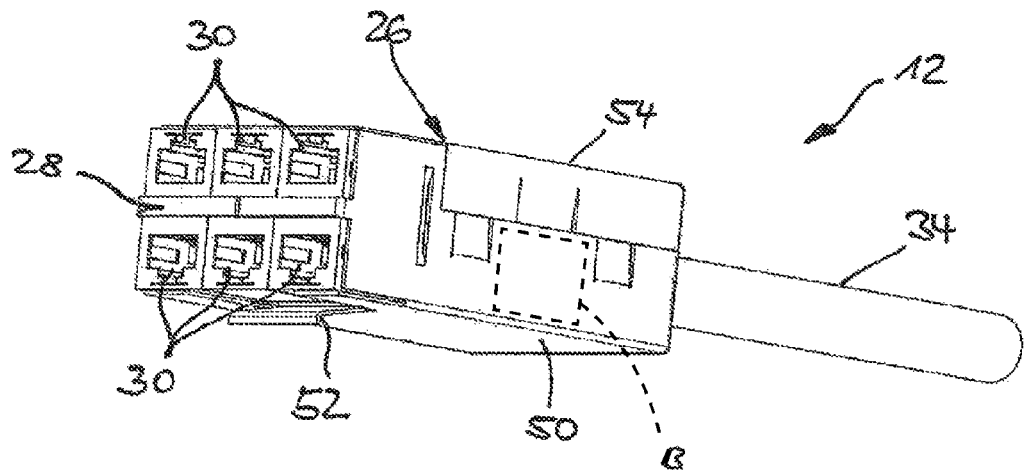
Figure 4:
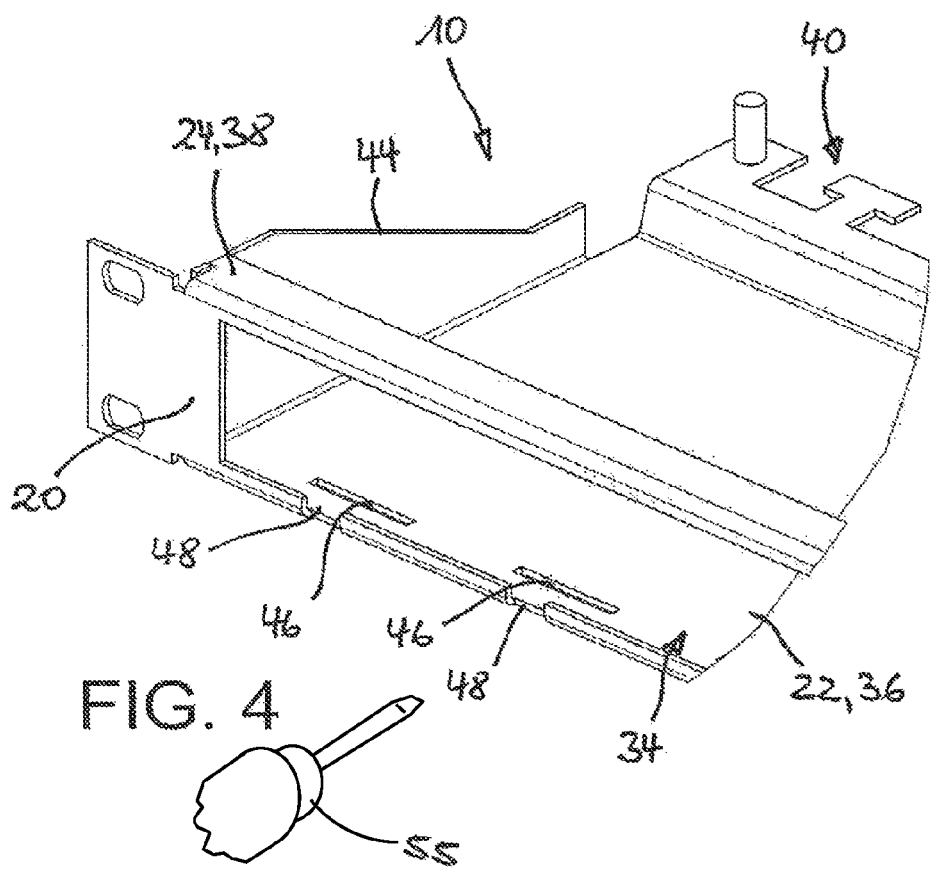
Figure 5:
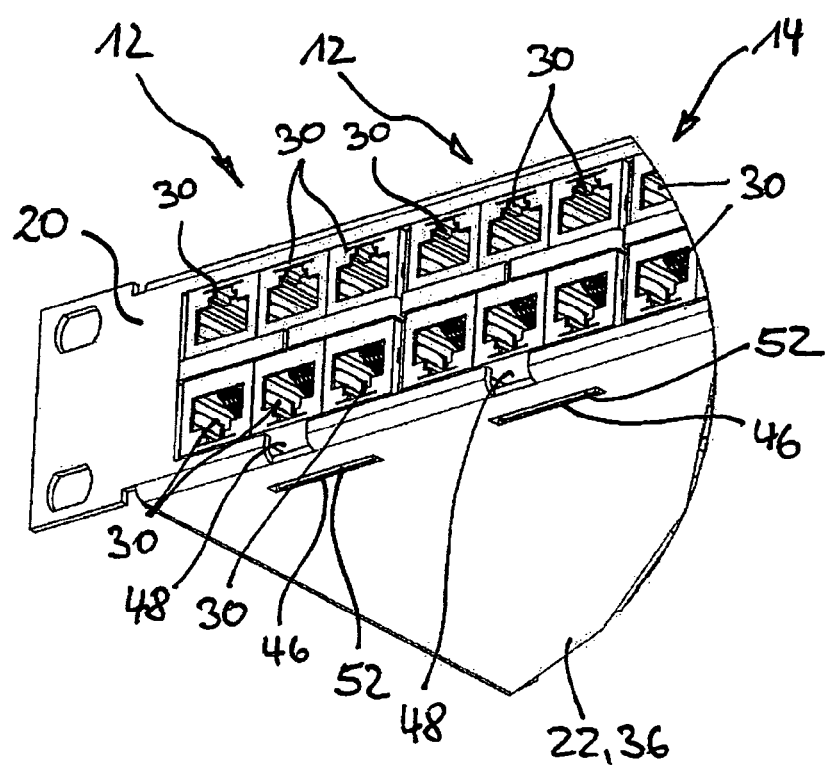

FIG. 1 shows a distribution panel formed from a carrying device and a multiplicity of distribution modules assembled on the carrying device in accordance with a preferred embodiment of the invention, FIG. 2 shows the carrying device already shown in FIG. 1, FIG. 3 shows one of the distribution modules in detail, FIG. 4 shows a sub-region of the carrying device in detail, and FIG. 5 shows the sub-region of the carrying device with distribution modules assembled therein.

FIG. 1 shows a distribution panel 14, which is formed from a carrying device (a panel) 10 and a multiplicity (here eight) of distribution modules 12 assembled on/in the carrying device 10. Here, the carrying device 10 and the distribution modules 12, irrespectively of whether or not they are assembled, form a system 16 for forming such a distribution panel 12.

The carrying device 10 has a U-profile-shaped accommodating part 18, for which a front plate 20 of the carrying device 10 forms the base of the U-profile shape. The legs 22, 24 of the U-profile shape are of different length, as can be clearly seen in FIG. 2. Each of the distribution modules 12 has a housing 26 and at its head end 28 a multiplicity of connection sockets 30 (more specifically six connection sockets 30). The head ends 28 of the distribution modules 12 are inserted into the accommodating part 18 and the distribution modules 12 are each fastened to the leg 22 of the accommodating part 18 by means of a respective clip connection (not shown in FIG. 1).

An aperture 32 is formed in the front plate 20. The head ends 28 of the distribution modules 12 are opposite the back side of the front plate 20 in the case of the distribution modules 12 fastened to the carrying device 10. Due to the aperture 32, the front plate 20 enables access from the front to the connection sockets 30 of the distribution modules 12 assembled in a row.

Each of the distribution modules 12 also has, in the housing 26, a printed circuit board B (indicated schematically in FIG. 3), via which the connection sockets 30 of this module 12 are electrically connected to a cable 34 arranged at an end of the distribution module 12 opposite the head end 28.

The carrying device 10 is shown separately in FIG. 2. Here, the front plate 20 with the aperture 32 as the base of the U-profile-shaped accommodating part 18 can be clearly seen. One leg 22 of this U-profile shape is formed by a base plate 36, and the other leg 24 is formed by a strip 38 opposite and at a distance from the base plate 36. In the case of the U-profile shape thus formed, the other leg 24 is much shorter than the leg 22.

At the free end of the base plate 36, structures 40 for guiding the cable 34 are formed. To stabilise the carrying device 10, this has a termination plate 42, 44 at each of the two ends of the U-profile-shaped accommodating part 18. The carrying device 10 further has recess structures 46 on the base plate 36, which are formed as slits.

Besides the aperture 32, a number of openings 48 corresponding to the number of modules 12 that can be assembled are also formed in the front plate 20, just below the base plate 36.

The carrying device 10 is a carrying device for installation in a 19-inch rack.

FIG. 3 shows an individual one of the distribution modules 12. As already mentioned, this comprises the (preferably openable) housing 26 and a plurality of connection sockets 30 at its head end 28. A resiliently mounted detent structure 52 is formed on a housing part 50, more specifically a housing base part, of the housing 26 and can engage with the corresponding recess structure 46 of the carrying device 10 to form the clip connection or also engages with these in the case of the situation shown in FIG. 1. A further housing part 54 is formed as a housing cover.

FIG. 4 shows an edge region of the carrying device 10. Here, it can be clearly seen that each of the openings 48 is located at the height of the respective recess structure 46 in the base plate 36. Each of the openings 48 is an extension of the aperture 32 in the front plate 20.

Furthermore, it can be clearly seen in this illustration that the carrying device 10 is formed substantially from a stamped and bent part.

FIG. 5 lastly shows the distribution panel 14 in the region in which the carrying device 10 was shown previously in FIG. 3, but from a different viewing angle.

The following function is provided: For assembly of the modular distribution panel 14, the distribution modules 12 are inserted (slid) individually from behind at an incline into the U-profile-shaped accommodating part 18 of the carrying device 10 and are then swivelled into the fixed position, wherein the clip connection latches in place.

To detach the clip connection, a pin-shaped tool 55 is inserted through the corresponding opening 48 in the front plate 20 as far as the corresponding detent structure 52 and then detaches the latching clip connection by lifting the detent structure 52 out from the recess structure 46.

Particularly advantageous embodiments of the invention and advantages thereof will be described again hereinafter in different words:

In the case of the modular distribution panel 14, the distribution modules 12 are exchangeable (with 3 by 3 RJ45 sockets 30 or other fasteners/connection devices in copper or LWL). The following standards are used as a basis for this: IEC 60297-1, Dimensions of mechanical structures of the 482.6 mm (19 in) series—Part 1: Panels and racks, IEC 60297-2, Dimensions of mechanical structures of the 482.6 mm (19 in) series—Part 2: Cabinets and pitches of rack structures, and IEC 60297-3-101 (Dimensions of electronic devices of the 482.6 mm (19 in) series—Part 3-101: Subracks and units (IEC 60297-3-101:2004)), which describes the basic structure and the dimensions of such a distribution panel 14.

For the distribution panel 14, the transmission properties are to be met as cabling paths (in accordance with ISO/IEC 11801 according to class "D,E,$E_A$,F,$F_A$ or above". Likewise, the transmission properties also have to be met as a fastener in accordance with ISO/IEC 11801 of category 5,6,$6_A$,7,$7_A$ or above. In LWL, other connection techniques are possible (for example LC, ST, E-2000) with their insertion and return loss damping values according to ISO/IEC 11801 and IEC 24702.

In accordance with the above-mentioned standard, the carrying device 10 (the panel) in the 19 inch raster must have 48 RJ45 ports over one height unit or other fasteners in accordance with ISO/IEC 11801. This is achieved by the installation of eight individual modules 12, in which 3 by 2 sockets 30 are arranged. This results from the subsequent 48-core data cable.

The modular distribution panel 14 consists substantially of the carrying device 10 and the eight insertable, fabricated modules 12. The carrying device 10 consists of a 1.5 mm thick steel sheet, which is powder-coated or painted after the bending process, or consists of stainless steel.

On the front side, the carrying device 10 is configured in accordance with the standard as a 19-inch panel. Furthermore, a large recess, into which the individual modules 12 can be slid from the back side, is formed in the accommodating part 18 in the front region of the carrying device 10. Eight smaller openings 48 enable the unlocking of the individual modules 12 by means of a screwdriver (slot) or another suitable tool from the front side. The modules 12 are unlocked by inserting the tool into the slot and lifting the detent structure (detent hook on the spring tongue) 52 on the module 12.

On the back side, the metal sheet is bent upwardly in order to collect any forces, for example with the aid of a cable tie, that are produced by the hanging cable 34.

The module 12 consists of the individual parts constituted by the housing cover 54, housing base 50, cable carrier and a bracket, which is used to fix the cable 34. The base and cover 50, 54 consist of chromated sheet metal with a thickness of 0.75 mm. The cable carrier and the bracket are formed with a sheet metal thickness of 1 mm due to the mechanical stress produced by the cable 34.

The base of the module is canted according to FIG. 3 once the sheet metal has been cut to size. The two long wide webs at the head end 28 are used to fix the fasteners, and stickers for port labelling are applied hereto at the same time. Two long tabs are formed on the sides in order to prevent the fasteners from dipping into the module 12. On the underside, the cut-out tab is bent to form the detent structure with detent hook and spring tongue. For this purpose, the tab is bent downwardly by a few degrees with respect to the base surface. The end piece of the tab is bent sharply downwardly by 90° (the base forming the reference plane) in order to dip into the accommodating structure 46 in the carrying device 10. The four upright tabs are used later for latching to the housing cover 54. An elongate or round embossment from the outside in is made in the tabs so as to produce the latched connection here to the cover 54.

The cover of the module 12 is likewise canted once the sheet metal has been cut to size. The two large side tabs are used to adjust the cover on the base 50, and at the same time a "slight" press fit is produced.

As with the housing base 50, embossments from the inside out are provided on the sides and enable a form fit with the base 50. The two elongate recesses in the front part of the cover 54 are used for latching on the carrying device 10.

Prior to the assembly of the module, the module base is provided with cable carriers and carrier pins (not shown). These are intended to later carry the fitted and fabricated printed circuit board.

The cable carrier receives the printed circuit board and additionally performs the function of a tension relief for the cable 34. The cable 34 is fitted between the cable carrier and the bracket. By screwing together the bracket and cable carrier, the cable 34 is fixed (not shown). The teeth on the cable carrier on the one hand have a spring effect, as a result of which the fixing effect is increased, and on the other hand the teeth cut into the cable sheath when an attempt is made to pull the cable violently out from the module (tension relief).

Once the base part has been fabricated, the previously fitted printed circuit board with the fasteners and the laid cable 34 is inserted and screwed into the housing 26. Lastly, the cover of the module 12 is fitted and is latched to the base of the module 12.

The module 12 is hereby firstly mounted from above into the accommodating part 18 of the carrying device and is then pressed downwardly and pivoted. The detent structure 52 is hereby slid into the associated recess structure 46 in the base plate 36, and the module 12 is latched in the carrying device (the panel)

LIST OF REFERENCE SIGNS carrying device 10
distribution module 12
distribution panel 14
system 16
accommodating part 18
front plate 20
leg 22
leg 24
housing 26
head end 28
connection socket 30
aperture 32
cable 34
base plate 36
strip 38
structure 40
termination plate 42
termination plate 44
recess structure 46
opening 48
housing part 50
detent structure 52
housing part 54

The invention claimed is:

1. A system for forming a modular distribution panel, comprising a carrying device having a front plate and comprising at least one distribution module, which has at least one connection socket at a head end, wherein the head end of the at least one distribution module is opposite a back side of the front plate when the distribution module is fastened to the carrying device and the front plate enables access to the at least one connection socket from the front, wherein the carrying device has a U-profile-shaped accommodating part, for which the front plate forms the base of the U-profile shape and into which the head end of the at least one distribution module can be inserted, wherein the distribution module can be detachably fastened to the carrying device at the head end inserted into the accommodating part by means of a clip connection, and wherein legs of the U-profile-shaped accommodating part are formed by a base plate and a strip opposite the base plate, wherein the leg formed by the base plate is longer than the leg of the U-profile shape formed by the strip.

2. The system according to claim 1, wherein the clip connection or each of the clip connections is formed by a detent structure engaging resiliently with a recess structure, wherein one of these structures is formed on the distribution module and the other of these structures is formed on the carrying device.

3. The system according to claim 1, wherein the at least one distribution module has a housing, which comprises a housing part, in particular a housing base part, on which the detent structure is formed.

4. The system according to claim 1, wherein at least one opening is also formed in the front plate, through which opening a pin-shaped tool can be inserted as far as the corresponding detent structure in order to detach the at least one clip connection.

5. A method for assembling a modular distribution panel, from the components of a system according to claim 1, wherein the at least one distribution module is inserted at an incline into the U-profile-shaped accommodating part and is then swivelled in, wherein the clip connection latches in place.

6. The system according to claim 3, wherein the resiliently engaging detent structure is a detent hook arranged on a spring tongue.

7. The system according to claim 6, wherein the detent hook is formed on the free end of the spring tongue.

8. The system according to claim 6, wherein the spring tongue extends along the outer face of the housing part in a latched state.

9. The system according to claim 6, wherein the spring tongue extends in the latched state via its free end in the direction of the head end.

10. A system for forming a modular distribution panel, comprising a carrying device having a front plate and comprising at least one distribution module, which has at least one connection socket at a head end, wherein the head end of the at least one distribution module is opposite the back side of the front plate when the distribution module is fastened to the carrying device and the front plate enables access to the at least one connection socket from the front, the carrying device has a U-profile-shaped accommodating part, for which the front plate forms the base of the U-profile shape and into which the head end of the at least one distribution module can be inserted, wherein the distribution module can be detachably fastened to the carrying device at the head end inserted into the accommodating part by means of a clip connection, and wherein the at least one distribution module has a printed circuit board, via which the at least one connection socket is electrically connected to another connection device, in particular a cable, arranged at an end of the distribution module opposite the head end.

11. The system according to claim 10, wherein a plurality of connection sockets are provided per distribution module and are arranged on either side of the printed circuit board.

* * * * *